US012598604B2

(12) United States Patent
He et al.

(10) Patent No.: US 12,598,604 B2
(45) Date of Patent: Apr. 7, 2026

(54) UPLINK CONTROL INFORMATION FOR ENABLING AUTONOMOUS UPLINK TRANSMISSIONS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Pengkai Zhao, Cupertino, CA (US); Wei Zeng, Saratoga, CA (US); Wei Zhang, Santa Clara, CA (US); Weidong Yang, San Diego, CA (US); Yuchul Kim, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 17/995,451

(22) PCT Filed: Apr. 8, 2020

(86) PCT No.: PCT/CN2020/083736

§ 371 (c)(1),
(2) Date: Oct. 4, 2022

(87) PCT Pub. No.: WO2021/203289

PCT Pub. Date: Oct. 14, 2021

(65) Prior Publication Data

US 2023/0199750 A1 Jun. 22, 2023

(51) Int. Cl.
*H04W 72/1263* (2023.01)
*H04B 7/06* (2006.01)
(Continued)

(52) U.S. Cl.
CPC ...... *H04W 72/1263* (2013.01); *H04B 7/0626* (2013.01); *H04L 1/1812* (2013.01); *H04L 5/0051* (2013.01); *H04W 72/21* (2023.01)

(58) Field of Classification Search
CPC .............. H04W 72/1263; H04W 72/21; H04B 7/0626; H04L 1/1812; H04L 5/005
(Continued)

(56) References Cited

U.S. PATENT DOCUMENTS

2014/0301231 A1 10/2014 Hooli et al.
2021/0100024 A1* 4/2021 Bang ..................... H04L 5/0051
(Continued)

FOREIGN PATENT DOCUMENTS

CN 107801246 3/2018
WO 2018/145126 A2 8/2018

OTHER PUBLICATIONS

Vivo, "Discussion on the enhancements to configured grants"; 3GPP TSG RAN WG1 #98bis, R1-1910207, Oct. 4, 2019.
(Continued)

*Primary Examiner* — Chi Tang P Cheng
(74) *Attorney, Agent, or Firm* — Fay Kaplun & Marcin, LLP

(57) ABSTRACT

Embodiments include a computer readable storage medium, a user equipment, a method and an integrated circuit that perform operations. The operations include generating configured grant uplink control information (CG-UCI), generating hybrid automatic repeat request acknowledgement (HARQ-ACK) information, generating channel state information (CSI) and mapping the CG-UCI, HARQ-ACK, and CSI to resource elements (REs) in resource blocks (RBs) of a configured grant physical uplink shared channel (PUSCH) transmission, wherein the PUSCH transmission includes a demodulation reference signal (DMRS) and wherein the mapping includes one of mapping a concatenated bit sequence or omitting a portion of the CSI.

14 Claims, 6 Drawing Sheets

(51) Int. Cl.
H04L 1/1812 (2023.01)
H04L 5/00 (2006.01)
H04W 72/21 (2023.01)

(58) Field of Classification Search
USPC ........................................................ 370/329
See application file for complete search history.

(56) References Cited

U.S. PATENT DOCUMENTS

2021/0194622 A1* 6/2021 Takeda .................. H04L 1/0003
2021/0315000 A1* 10/2021 Li .......................... H04W 72/21

OTHER PUBLICATIONS

LG Electronics, "Discussion on configured grant for NR-U"; 3GPP
TSG RAN WG1 Meeting #99, R1-1912392, Nov. 9, 2019.
OPPO: "On configured grant for NR-U", 3GPP TSG RAN WG1
99, R1-1912509, Nov. 9, 2019, 3 sheets.
Vivo: "Discussion on the enhancements to configured grants",
3GPP TSG RAN WG1 #99, R1-1912015, Nov. 8, 2019, 11 sheets.
3rd Generation Partnership Project; Technical Specification Group
Radio Access Network; NR; Multiplexing and channel coding
(Release 16), 3GPP TS 38.212 V16.0.0, Dec. 2019, 145 sheets.

* cited by examiner

Method 300

UPLINK CONTROL INFORMATION FOR ENABLING AUTONOMOUS UPLINK TRANSMISSIONS

BACKGROUND

A user equipment (UE) may establish a connection to at least one of a plurality of different networks or types of networks. When establishing the network connection such as, for example, a connection to a 5G new radio (NR) network, the UE may connect to the network through an unlicensed part of the spectrum.

For NR unlicensed operation (NR-U), autonomous uplink (UL) transmission (AUL) and asynchronous hybrid automatic repeat request (HARQ) retransmission are being utilize in NR-U to avoid long delays due to the uncertainty of channel availability on the unlicensed part of the spectrum. To achieve this goal, a new configured grant (CG)-based uplink control information (CG-UCI) was introduced to signal the selected HARQ process identification (ID), redundancy version (RV), and new data indicator (NDI) for a physical uplink shared channel (PUSCH) transmission. Currently, PUSCH already supports the multiplexing of three UCI types: HARQ acknowledgement (HARQ-ACK), channel state information (CSI) part 1, CSI part 2. If another UCI was added, the addition would increase the specification and implementation complexity. As such, three UCIs in a PUSCH transmission have been utilized to control the timing budget for UCI multiplexing.

SUMMARY

Some exemplary embodiments include a computer readable storage medium comprising a set of instructions that when executed by a processor cause the processor to perform operations. The operations include, comprising generating configured grant uplink control information (CG-UCI), generating hybrid automatic repeat request acknowledgement (HARQ-ACK) information, generating channel state information (CSI) and mapping the CG-UCI, HARQ-ACK, and CSI to resource elements (REs) in resource blocks (RBs) of a configured grant physical uplink shared channel (PUSCH) transmission, wherein the PUSCH transmission includes a demodulation reference signal (DMRS).

Other exemplary embodiments include a user equipment (UE) connected to a 5G new radio (NR) network on a frequency band in an unlicensed spectrum. The UE includes a processor configured to generate configured grant uplink control information (CG-UCI), generate hybrid automatic repeat request acknowledgement (HARQ-ACK) information, generate channel state information (CSI) and map the CG-UCI, HARQ-ACK, and CSI to resource elements (REs) of a configured grant physical uplink shared channel (PUSCH) transmission, wherein the PUSCH transmission includes a demodulation reference signal (DMRS). The UE further includes a transceiver configured to transmit the CG-PUSCH to the 5G NR network over the frequency band.

DETAILED DESCRIPTION

Figure 1:
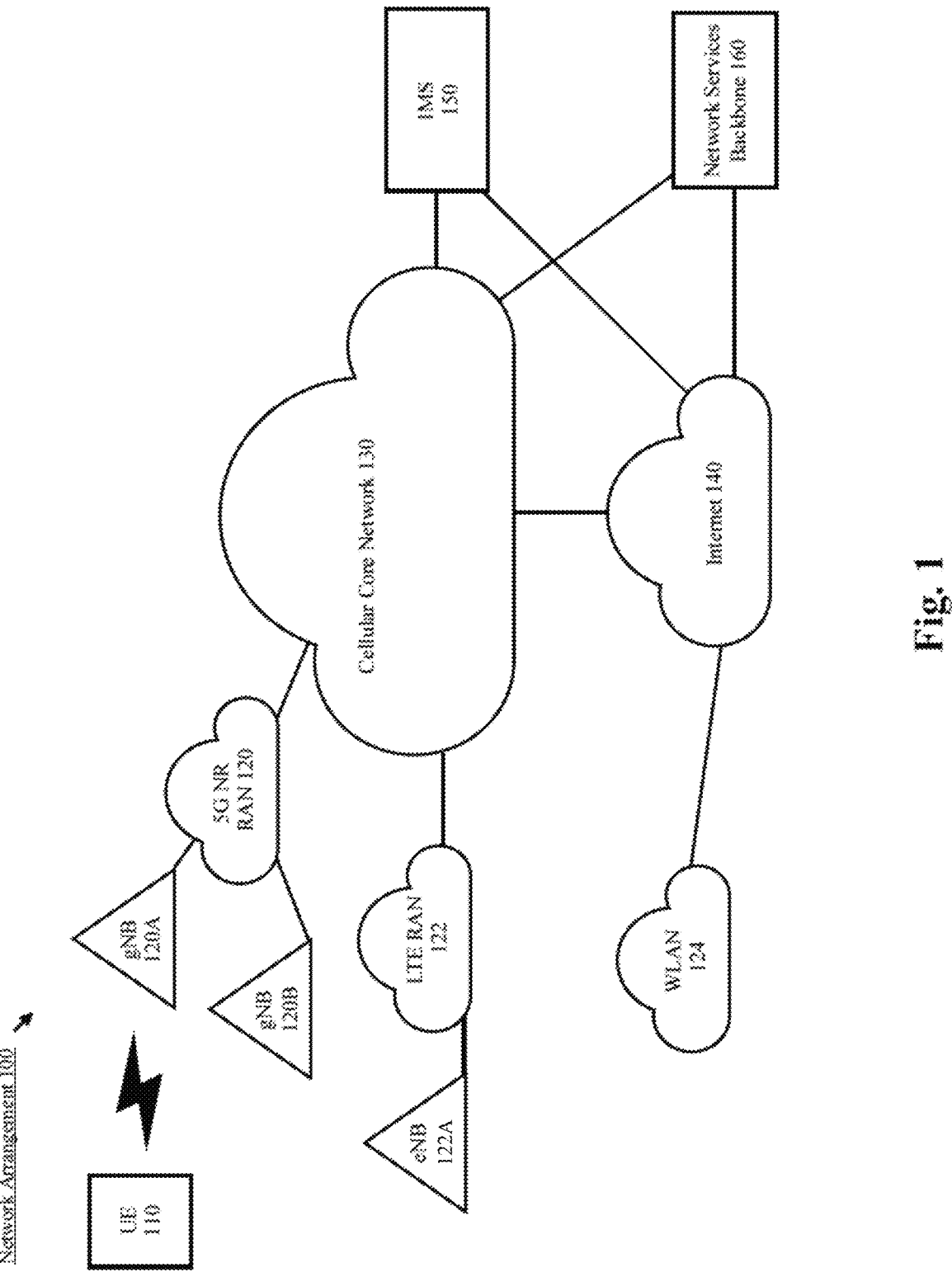
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) sending UCI information to a g-node B (gNB) of a 5G new radio (NR) network over an unlicensed (NR-U) band of spectrum. The exemplary embodiments allow for the autonomous transmission of information from the UE over 5G NR-U without the need for the UE to send a scheduling request and wait for an uplink grant from the gNB.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include a Long-Term Evolution (LTE) RAT even though the following description will focus primarily on 5G NR RAT. Although the UE can communicate with the network over both licensed and unlicensed bands of the spectrum, the following description will focus primarily on NR-U communications between the UE and the network.

A first issue with enabling efficient configured grant physical uplink shared channel (CG-PUSCH) transmissions for NR-U is how to prioritize an uplink control information (UCI) transmission if the total number of UCI types in a slot, which includes CG-UCI and legacy UCIs, exceeds the maximum value (e.g., three UCIs, as discussed above).

According to exemplary embodiments, when the CG-PUSCH transmission includes more than three UCI types, a CG-UCI and a HARQ-ACK may be concatenated prior to coding and multiplexing of the UCI information. As a result, the CG-UCI may be mapped as a singular encoded UCI instead of two separate (CG-UCI plus HARQ-ACK) UCIs.

According to further exemplary embodiments, when the CG-PUSCH transmission includes more than three UCI types, the UE may determine which UCI contains the least important information and omit that UCI (e.g., leave it out from the coding and multiplexing).

A second issue with enabling efficient CG-PUSCH transmissions for NR-U is how to map the selected UCI information on physical resources scheduled for a PUSCH assuming that a subset of the UCIs is selected.

According to embodiments of the disclosure, the UE determines which UCI bits to map at the beginning of a resource block group (RBG) and which to map immediately after a demodulation reference signal (DMRS) resource element based on a determined priority, as will be discussed below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
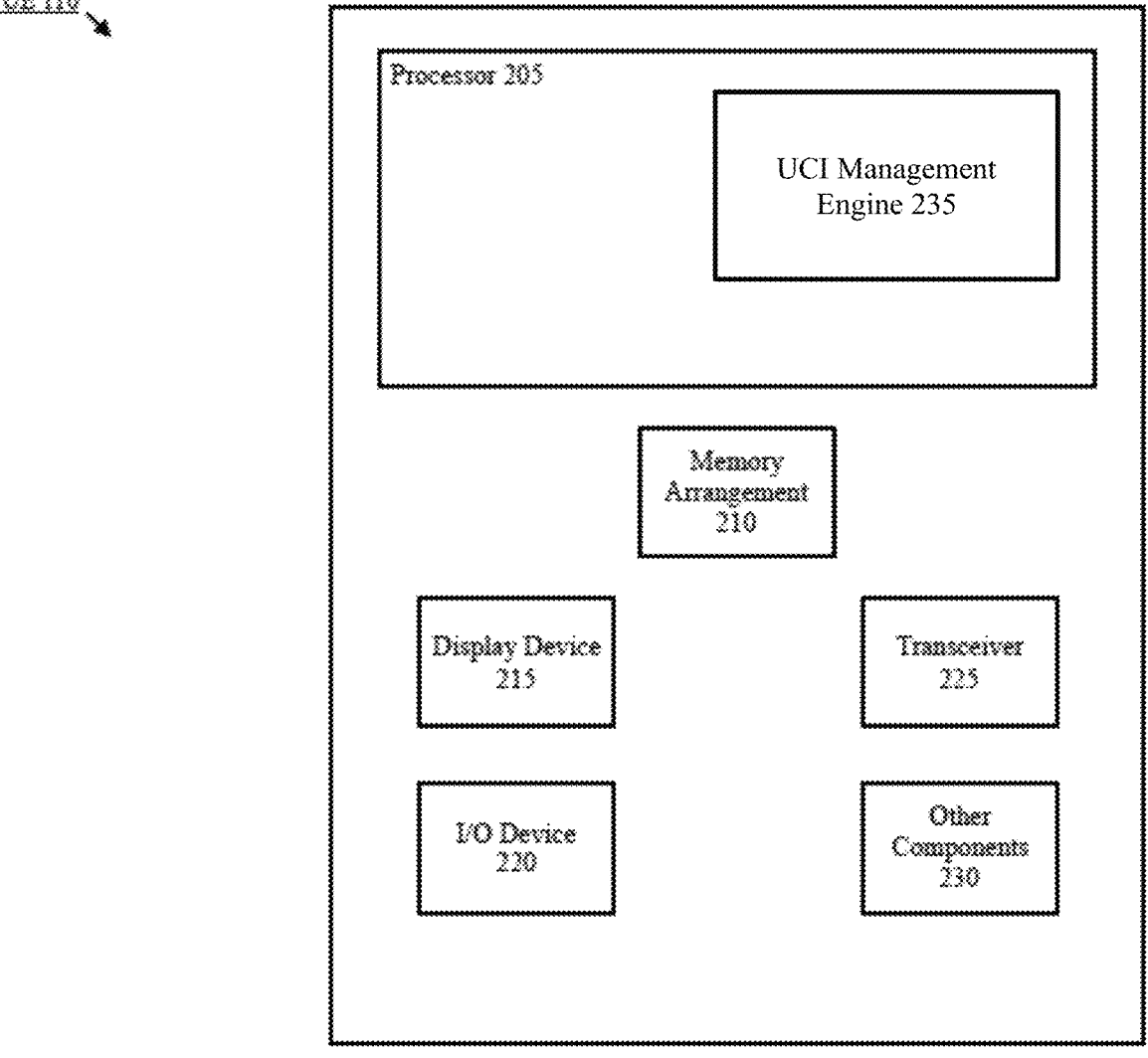
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a UCI management engine 235. The UCI management engine 235 may perform various operations related to configuring a CG-PUSCH transmission to one of the gNBs 120A, 120B over an unlicensed band of spectrum.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3A:
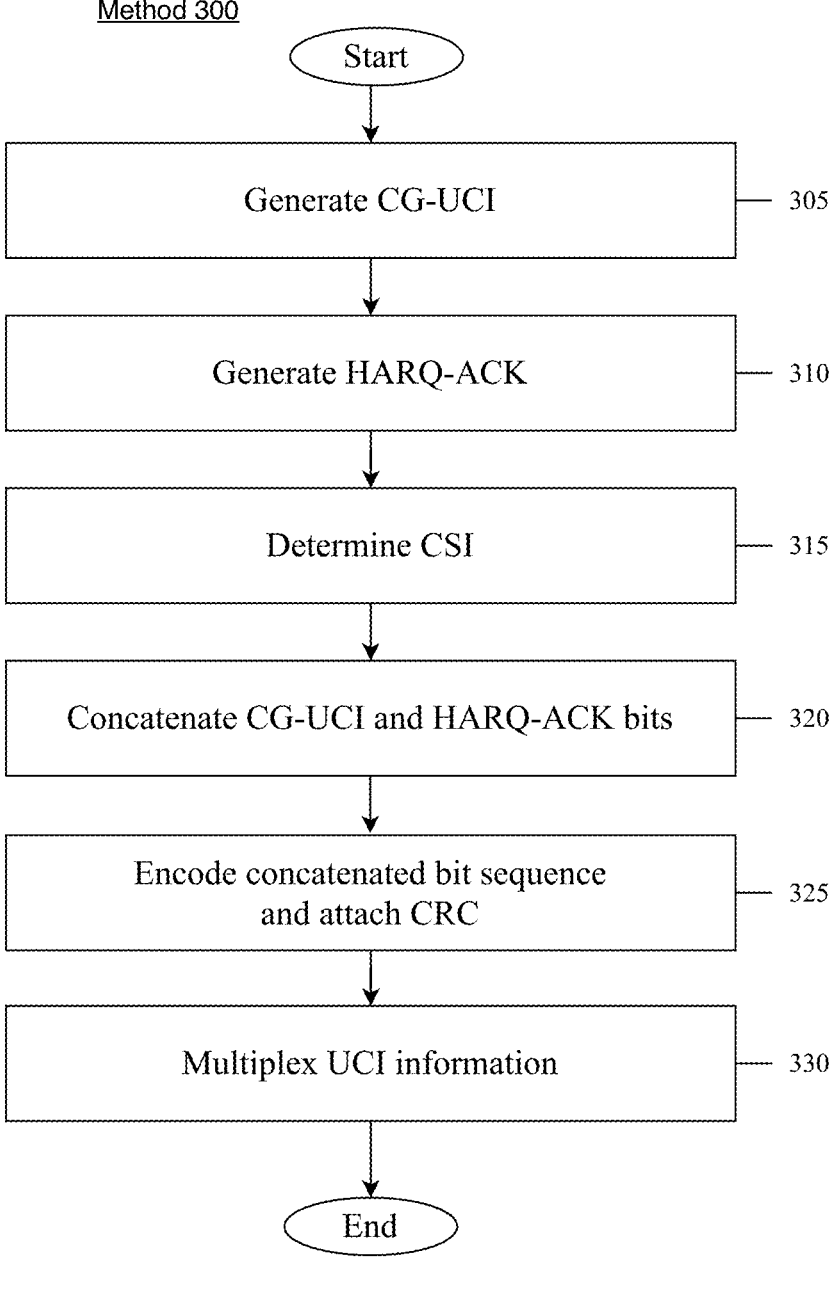
FIG. 3A shows a method of coding bits according to various exemplary embodiments.

FIG. 3A shows a method 300 of coding bits according to various exemplary embodiments. The method 300 is performed by the UE 110 allows for autonomous uplink transmission on 5G NR-U using a configured grant PUSCH resource from the gNB 120A or 120B without the need for a scheduling request first and subsequent uplink grant for the uplink transmission. At 305, the UE 110 generates the CG-UCI information. In some embodiments, the CG-UCI may include any combination of the following information: a HARQ process ID, new data indicator (NDI), redundancy version (RV), channel occupancy time (COT) sharing information, the UE-ID, and listen-before-talk (LBT) priority. In addition, the CG-UCI includes the code block group transmission indicator (CBG-TI) as the ending symbol of the CG-PUSCH in the last slot. Because multiple UEs may be communicating with the gNB over the 5G NR-U, this information allows the gNB to identify from which UE a received transmission has been sent.

At 310, the UE 110 generates the HARQ-ACK information based on the decoding results of PDSCH receptions. At 315, the UE 110 determines CSI for the UL channel. In some embodiments, the UE 110 may divide the CSI into two parts, with each part include different CSI information. CSI part 1 has a fixed payload size and is used to identify the number of information bits in Part 2. For example, in some embodiments, CSI part 1 may include rank indicator (RI) and wideband information and the remaining CSI information may be incorporated into CSI part 2. In some embodiments, at 320, the UE 110 concatenates the CG-UCI and the HARQ-ACK bits. As a result of the concatenation, the CG-UCI and HARQ-ACK bits form one bit sequence. In some embodiments, the CG-UCI bits are at the beginning of the concatenated sequence to give the gNB as much time as possible to decode the CG-PUSCH since CG-UCI includes some sort of prerequisite information for decoding CG-PUSCH.

At 325, the concatenated CG-UCI and HARQ-ACK bit sequence is encoded and the CRC is attached. Finally, at 330, the UCIs are multiplexed (e.g., mapped) into resource elements (REs) of a CG-PUSCH, as described in more detail below.

Figure 3B:
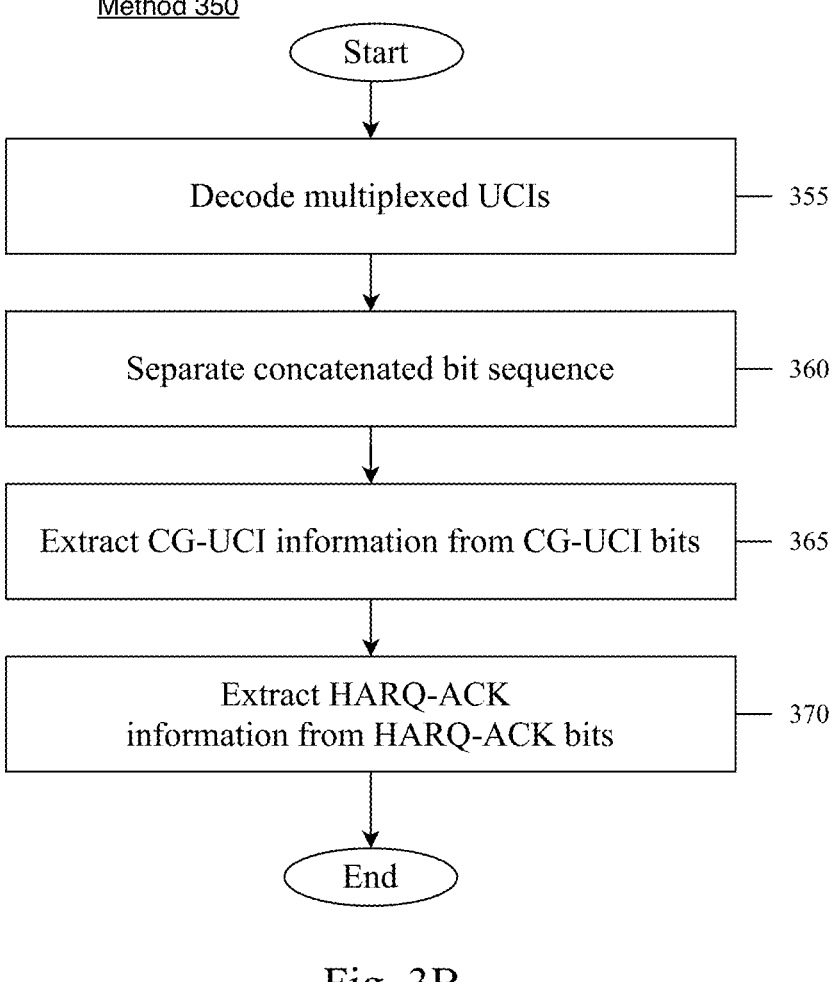
FIG. 3B shows a method of decoding bits according to various exemplary embodiments.

FIG. 3B shows a method 350 of decoding bits according to various exemplary embodiments. The method 350 is performed by the gNB (e.g., gNB 120A) after receiving the CG-PUSCH transmission from the UE 110 encoded at 330. At 355, the gNB decodes the multiplexed UCIs (e.g., the CG-UCI and HARQ-ACK bit sequence, the CSI part 1, and the CSI part 2) to extract the UCI data.

At 360, the gNB separates the concatenated bit sequence into separate CG-UCI bits and HARQ-ACK bits. At 365, the gNB extracts the CG-UCI information from the CG-UCI bits to obtain UE specific information so that the gNB can identify which UE sent the transmission. The extracted CG-UCE information may include, for example, a HARQ process ID, NDI, RV, COT sharing information, the UE-ID, LBT priority, and/or CBG-TI. At 370, the gNB extracts the HARQ-ACK information from the HARQ-ACK bits.

As will be described below, the UE 110, when multiplexing the CG-PUSCH transmission, may use different formats to multiplex the CG-PUSCH transmission. Thus, the gNB 120A to perform the decoding needs to understand the format used by the UE 110 when multiplexing the CG-PUSCH transmission. For example, the CG-PUSCH transmission may include the format used by the UE 110 so that the gNB 120A understands how to decode the CG-PUSCH transmission. In another example, the gNB 120A may instruct the UE 110 as to the format it should use when multiplexing CG-PUSCH transmissions, e.g., via RRC signaling, etc. In another exemplary embodiment, the multiplexing format may be set by standard.

Figure 4A:
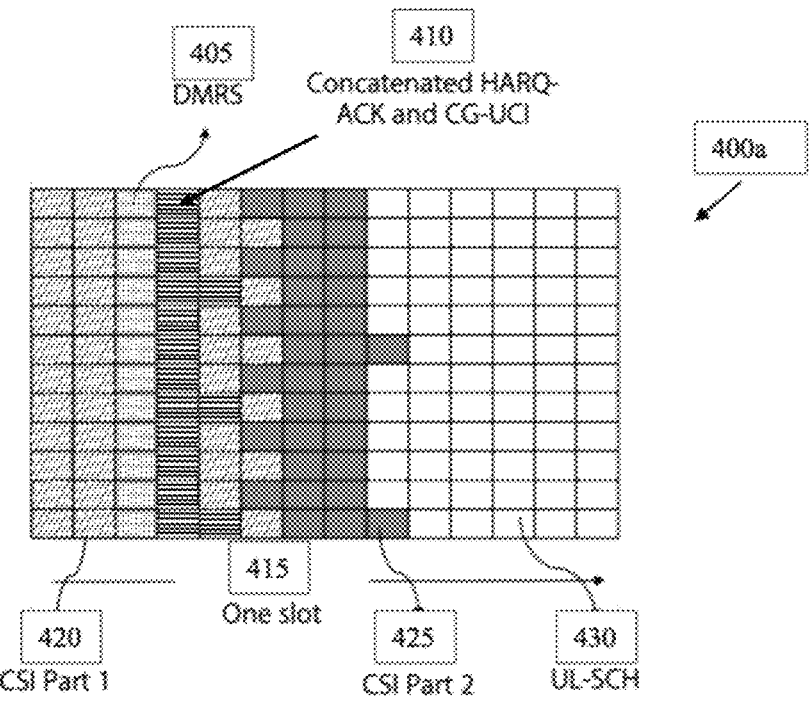
FIGS. 4A-4C show examples of an orthogonal frequency division multiple access (OFDMA) slot of a CG-PUSCH according to various exemplary embodiments.
Figure 4B:
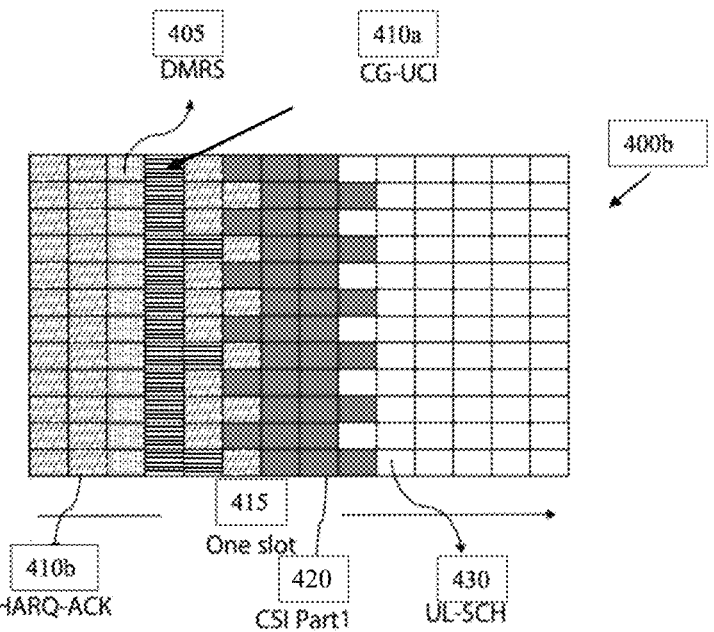
Figure 4C:
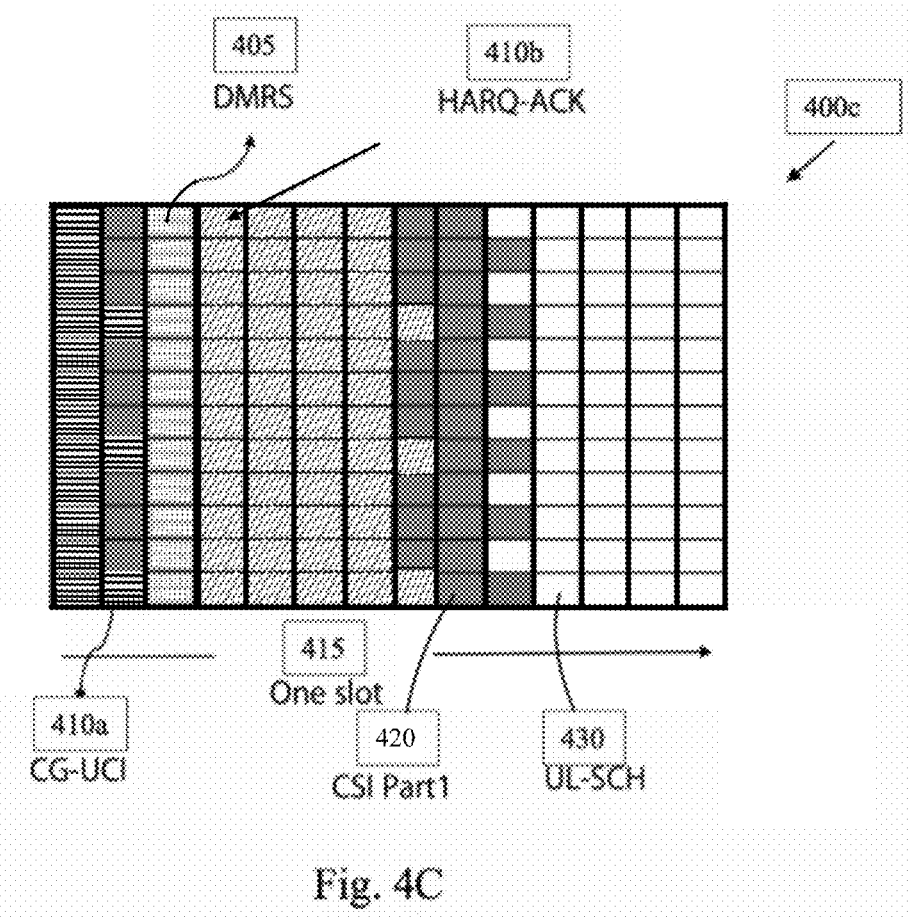

FIGS. 4A-4C shows examples of an orthogonal frequency division multiple access (OFDMA) slot of a CG-PUSCH according to various exemplary embodiments. In FIG. 4A, the CG-UCI and HARQ-ACK concatenated bit sequence 410 is mapped starting from the first symbol after the demodulation reference signal (DMRS) 405. In some cases, mapping a bit sequence immediately after the DMRS 405 provides improved performance with respect to frequency and time when compared with bits mapped in REs further away from the DMRS. As such, UCI information that is a higher priority may be mapped immediately after the DMRS. In FIG. 4A, the CG-UCI and HARQ-ACK concatenated bit sequence 410 is prioritized over other UCIs. Subsequently, the CSI part 1 420 is mapped beginning with the first resource element (RE) in the first resource block and the first symbol (the RE at the upper left corner) of the CG-PUSCH slot.

In some embodiments, the CSI part 1 420 is rate-matched with the CG-UCI and HARQ-ACK concatenated bit sequence 410. That is, if the number modulation symbols of bits of a given sequence is greater than the REs in PUSCH resource blocks of integer multiple symbols, the excess number of modulation symbols of bits are evenly distributed among the resource blocks of the next RE. For example, as shown in FIG. 4A, the number of REs in each RB is twelve. However, the number of modulation symbols of bits of the CG-UCI and HARQ-ACK concatenated bit sequence 410 is fifteen and the number of modulation symbols of bits of the CSI part 1 420 is thirty-five. As such, the bits of the CSI part 1 fill both REs before the DMRS and the bits of the CG-UCI and HARQ-ACK concatenated bit sequence 410 fill the entire RE immediately after the DMRS. The remaining bits of both the CG-UCI and HARQ-ACK concatenated bit sequence 410 and the CSI part 1 420 are evenly distributed in the following RE. Any remaining bits from the CSI part 1 420 are evenly distributed among the resource blocks of the next RE with bits of the CSI part 2 425. The remaining bits of the CSI part 2 are mapped in a similar manner as just described (filling as many REs as possible and then evenly distributing any remaining bits among the resource blocks of the following RE). Finally, the uplink shared channel (UL-SCH) 430 filled the remaining resource blocks of the CG-PUSCH slot.

In some embodiments, the UE 110 may omit one of the four UCIs to meet the three UCI limit instead of concatenating the CG-UCI and HARQ-ACK (e.g., 320 of method 300 may be omitted). In some embodiments, the UE 110 may omit the CSI part 2 data since CSI part 2 may include less critical information than CSI part 1 data. In such embodiments, the three UCIs (CG-UCI, HARQ-ACK, and CSI part 1) may be separately encoded (e.g., mapped) according to a desired priority. As shown in FIG. 4B, the CG-UCI 410a is prioritized and, therefore, mapped immediately after the DMRS 405. The HARQ-ACK 410b is mapped beginning from the first symbol of the CG-PUSCH slot and is rate-matched around the CG-UCI 410a in the rate-matching manner explained above. Subsequently, the CSI part 1 420 is mapped around the REs used by the HARQ-ACK 410b and the CG-UCI 410a as depicted in FIG. 4B.

In FIG. 4C, the HARQ-ACK 410b is alternatively prioritized and, therefore, mapped immediately after the DMRS 405. The CG-UCI 410a is mapped beginning from the first symbol of the CG-PUSCH slot and is rate-matched around the HARQ-ACK 410b in the rate-matching manner explained above. Subsequently, the CSI part 1 420 is mapped around the REs used by the CG-UCI 410a and the HARQ-ACK 410b as depicted in FIG. 4C. In this embodiment, the CG-UCI 410a is decoded at the gNB earlier than if CG-UCI 410a was mapped in subsequent REs.

In some embodiments, a CG-PUSCH transmission having a short duration (e.g., corresponding to 3 REs in frequency domain after performing Inverse Fast Fourier Transform (IFFT) operation), may be negatively impacted by a power transition period at the beginning and end of the CG-PUSCH transmission. As such, this transition period may be taken into consideration to avoid performance degradation of UCI transmissions. To address this issue, an offset is introduced into the CG-PUSCH during encoding so that the encoding skips a number of REs of the first RB that correspond to the power transition period. For example, if the CG-UCI 410a or the HARQ-ACK 410b are mapped before the DMRS 405, the corresponding bits are mapped beginning at some resource element later that the first resource element of the first resource block. In some embodiments, the UE 110 may be configured with this offset by gNB since different UEs may have different power transition periods. In some embodiments, this offset may alternatively be a fixed value.

Figure 5:
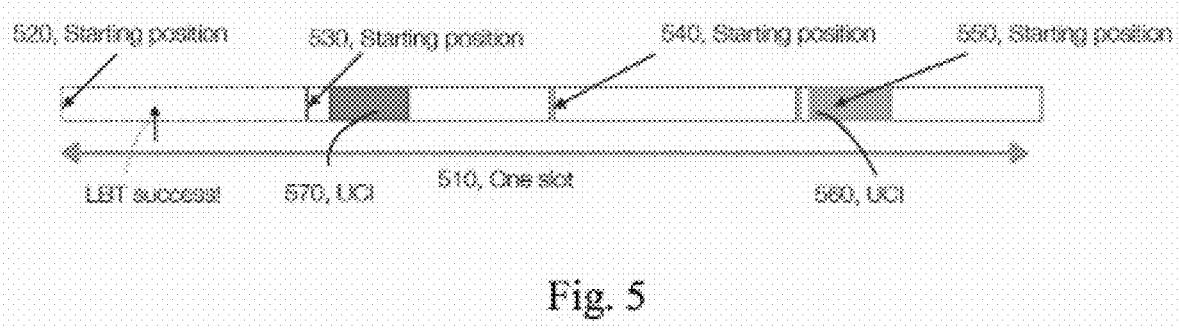
FIG. 5 shows an example subframe of a configured grant-physical uplink shared channel (CG-PUSCH) slot according to various exemplary embodiments.

FIG. 5 shows an example subframe/slot of a configured grant-physical uplink shared channel (CG-PUSCH) slot according to various exemplary embodiments. In some embodiments, to provide increased flexibility regarding the control of the code rate of CG-UCI on CG-PUSCH, a new beta offset value for UE autonomous transmissions on NR-U may be used to determine the REs number to include CG-UCI on CG-PUSCH, which is configured by radio resource control (RRC) signaling. In some embodiments, the beta offset value of HARQ-ACK may alternatively be used for CG-UCI.

In some embodiments, when multiple starting positions in a CG-PUSCH slot 510 are configured for a potential starting symbol of a CG-PUSCH transmission on NR-U, the mapping of a UCI 560 may be fixed to avoid hypothetical detection at the gNB. In some embodiments, the UCI 560 may be mapped starting from the last starting position within a slot (e.g., starting position 550 in FIG. 5). As a result, potential puncturing of the UCI 560 is avoided if mapping starts from 520, 530, or 540 and a listen before talk (LBT) process fails. Blind detection of the UL transmission at an eNB is also avoided due to fixed position which is known at gNB side as well.

In some embodiments, the UCI mapping of a starting symbol of a UL transmission may alternatively begin at the first starting position after LBT success (e.g., starting position 530 in FIG. 5). As a result, the latency of the CG-UCI transmission is decreased because the mapping begins at the starting position immediately after LBT success.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or micro-processor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor cause the processor of a user equipment (UE) to perform operations, comprising:
decoding, based on signaling receiving from a base station, a radio resource control (RRC) message comprising a beta offset value to be used for a configured grant physical uplink shared channel (CG-PUSCH) transmission;
generating configured grant uplink control information (CG-UCI);
generating hybrid automatic repeat request acknowledgement (HARQ-ACK) information;
generating channel state information (CSI); and
mapping the CG-UCI, HARQ-ACK, and CSI to resource elements (REs) in resource blocks (RBs) of the CG-PUSCH transmission based, at least in part, on the beta offset value, wherein the CG-PUSCH transmission includes a demodulation reference signal (DMRS), and wherein the mapping includes one of mapping a concatenated bit sequence;
concatenating the CG-UCI bits and the HARQ-ACK bits to form the concatenated bit sequence;
encoding the concatenated bit sequence; and
attaching a cyclic redundancy check (CRC), wherein the concatenating the CG-UCI bits and the HARQ-ACK bits occurs prior to the encoding and the attaching.

2. The non-transitory computer readable storage medium of claim 1, wherein the CSI comprises CSI part 1 bits and CSI part 2 bits.

3. The non-transitory computer readable storage medium of claim 2, wherein the portion of the CSI information that is omitted is the CSI part 2 bits,
wherein the CG-UCI is mapped to the resource elements immediately after the DMRS, wherein the HARQ-ACK is mapped at a beginning REs of the RBs, and wherein the HARQ-ACK is rate-matched to the CG-UCI.

4. The non-transitory computer readable storage medium of claim 2, wherein the portion of the CSI information that is omitted is the CSI part 2 bits,
wherein the HARQ-ACK is mapped to the resource elements immediately after the DMRS, wherein the CG-UCI is mapped at a beginning REs of the RBs, and wherein the CG-UCI is rate-matched to the HARQ-ACK.

5. The non-transitory computer readable storage medium of claim 1, wherein bits of CG-UCI precede bits of the HARQ-ACK or bits of CG-UCI prior to the bits of HARQ-ACK in the concatenated bit sequence.

6. The non-transitory computer readable storage medium of claim 1, wherein the concatenated bit sequence is mapped to the resource elements immediately after the DMRS, wherein the CSI part 1 bits are mapped at a beginning resource block of the REs of the RBs, and wherein the CSI part 1 bits are rate-matched to the concatenated bit sequence.

7. The non-transitory computer readable storage medium of claim 1, wherein mapping of the UCI begins after a predetermined starting position within multiple CG-PUSCHs configured by RRC.

8. The non-transitory computer readable storage medium of claim 7, wherein the predetermined starting position is a fixed starting position.

9. The non-transitory computer readable storage medium of claim 7, wherein the predetermined starting position is a starting position immediately following a successful listen before talk (LBT) process.

10. A user equipment (UE) connected to a 5G new radio (NR) network on a frequency band in an unlicensed spectrum, the UE comprising:

a processor configured to:

decode, based on signaling receiving from a base station, a radio resource control (RRC) message comprising a beta offset value to be used for a configured grant physical uplink shared channel (CG-PUSCH) transmission;

generate configured grant uplink control information (CG-UCI);

generate hybrid automatic repeat request acknowledgement (HARQ-ACK) information;

generate channel state information (CSI); and map the CG-UCI, HARQ-ACK, and CSI to resource elements (REs) of the CG-PUSCH transmission based, at least in part, on the beta offset value, wherein the PUSCH transmission includes a demodulation reference signal (DMRS); and

a transceiver configured to transmit the CG-PUSCH to the 5G NR network over the frequency band, wherein the processor is configured to one of map a concatenated bit sequence;

concatenating the CG-UCI bits and the HARQ-ACK bits to form the concatenated bit sequence;

encoding the concatenated bit sequence; and attaching a cyclic redundancy check (CRC), wherein the concatenating the CG-UCI bits and the HARQ-ACK bits occurs prior to the encoding and the attaching.

11. The UE of claim 10, wherein the CSI comprises CSI part 1 bits and CSI part 2 bits.

12. The UE of claim 11, wherein the portion of the CSI information that is omitted is the CSI part 2 bits, wherein the CG-UCI is mapped to the resource elements immediately after the DMRS, wherein the HARQ-ACK is mapped at a beginning RE of the RBs, and wherein the HARQ-ACK is rate-matched to the CG-UCI.

13. The UE of claim 11, wherein the portion of the CSI information that is omitted is the CSI part 2 bits, wherein the HARQ-ACK is mapped to the resource elements immediately after the DMRS, wherein the CG-UCI is mapped at a beginning RE of the RBs, and wherein the CG-UCI is rate-matched to the HARQ-ACK.

14. The UE of claim 10, wherein the concatenated bit sequence is mapped to the resource elements immediately after the DMRS, wherein the CSI part 1 bits are mapped at a beginning REs of the RBs, and wherein the CSI part 1 bits are rate-matched to the concatenated bit sequence.

\* \* \* \* \*